US012782231B2

(12) United States Patent
Warner et al.

(10) Patent No.: US 12,782,231 B2
(45) Date of Patent: Nov. 3, 2026

(54) ROCKER PANEL RESTRAINT CLAMP AND METHOD FOR SECURING SAME ONTO PINCH FLANGE OF VEHICLE

(71) Applicant: Honda Motor Co., Ltd., Tokyo (JP)

(72) Inventors: Brian Matthew Warner, Marysville, OH (US); James Przeklasa, Marysville, OH (US); Matthew L. Metka, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 307 days.

(21) Appl. No.: 18/622,114

(22) Filed: Mar. 29, 2024

(65) Prior Publication Data

US 2025/0305907 A1 Oct. 2, 2025

(51) Int. Cl.

| | |
|---|---|
| ***B25B 5/00*** | (2006.01) |
| ***B25B 5/10*** | (2006.01) |
| ***G01M 9/04*** | (2006.01) |

(52) U.S. Cl.

CPC ............... *G01M 9/04* (2013.01); *B25B 5/102* (2013.01)

(58) Field of Classification Search

CPC ... B25B 5/00; B25B 5/102; B60S 9/00; B60S 9/04; B60S 9/18

See application file for complete search history.

(56) References Cited

U.S. PATENT DOCUMENTS

| | | | | |
|---|---|---|---|---|
| 4,070,899 | A | 1/1978 | Venalainen | |
| 4,516,423 | A | 5/1985 | Reich | |
| 4,573,337 | A | 3/1986 | Papesh | |
| 4,628,723 | A | 12/1986 | Buske | |
| 4,848,733 | A * | 7/1989 | Yamauchi | B66F 3/12 254/126 |
| 4,862,727 | A | 9/1989 | Bergeron | |
| 6,231,095 | B1 | 5/2001 | Chou et al. | |
| 6,502,809 | B1 * | 1/2003 | Gionta | B25B 1/2478 269/154 |
| 6,568,237 | B1 | 5/2003 | Graham et al. | |
| 8,066,270 | B2 * | 11/2011 | Siegel | B25B 1/2452 269/282 |

(Continued)

FOREIGN PATENT DOCUMENTS

| | | |
|---|---|---|
| CN | 202071901 U | 12/2011 |
| CN | 206269774 U | 6/2017 |

(Continued)

*Primary Examiner* — Lee D Wilson

(74) *Attorney, Agent, or Firm* — KENEALY VAIDYA LLP

(57) ABSTRACT

A clamp can include a main clamp body, moving clamp body, a first jaw and a second jaw. The moving clamp body can be supported by and movable relative to the main clamp body. The first jaw can be connected to the main clamp body and rotatable relative to the main clamp body. The second jaw can be connected to the moving clamp body and rotatable relative to the moving clamp body. The clamp can further include a pin connected to the main clamp body so that the main clamp body and the pin can rotate relative to one another. The clamp can further include am adapter connected to the pin so that the adapter and the pin can rotate relative to one another. Rotational motion of the jaws, the main clamp body and the pin, and the pin and the adapter can be locked independently of one another.

17 Claims, 9 Drawing Sheets

(56) References Cited

U.S. PATENT DOCUMENTS

| | | | | |
|---|---|---|---|---|
| 8,210,510 | B2 * | 7/2012 | Li | B25B 5/10 269/291 |
| 8,226,074 | B1 * | 7/2012 | Hughey | B25B 5/003 269/238 |
| 8,376,340 | B2 * | 2/2013 | Sandmeier | B23Q 3/12 269/95 |
| 10,167,019 | B2 | 1/2019 | Ayuzawa et al. | |
| 10,696,088 | B2 * | 6/2020 | Walters | B43K 25/022 |
| 11,020,782 | B2 | 6/2021 | Venalainen | |
| 12,059,320 | B1 * | 8/2024 | Alangari | A61C 13/12 |
| 12,343,845 | B1 * | 7/2025 | Lindsay | B25B 1/2426 |
| 2008/0272349 | A1 * | 11/2008 | Alluru | B66F 3/12 296/1.01 |
| 2012/0128413 | A1 | 5/2012 | Suwazono | |
| 2013/0187107 | A1 * | 7/2013 | Coccaro | B66F 3/35 254/93 R |
| 2018/0207700 | A1 | 7/2018 | Serbes | |
| 2020/0255068 | A1 | 8/2020 | De Smidt et al. | |
| 2025/0137873 | A1 * | 5/2025 | Warner | G01M 17/0074 |
| 2025/0305907 | A1 * | 10/2025 | Warner | B25B 5/102 |

FOREIGN PATENT DOCUMENTS

| | | | |
|---|---|---|---|
| CN | 207445560 | U | 6/2018 |
| CN | 207790865 | U | 8/2018 |
| CN | 209126811 | U | 7/2019 |
| CN | 110108436 | A | 8/2019 |
| CN | 210232279 | U | 4/2020 |
| CN | 211519681 | U | 9/2020 |
| EP | 0215512 | A3 | 10/1987 |
| JP | H0632209 | A | 2/1994 |
| JP | 2004161078 | A | 6/2004 |
| JP | 2022068541 | A | 5/2022 |
| KR | 101085821 | B1 | 11/2011 |
| KR | 101687512 | B1 | 12/2016 |

* cited by examiner

ROCKER PANEL RESTRAINT CLAMP AND METHOD FOR SECURING SAME ONTO PINCH FLANGE OF VEHICLE

BACKGROUND

The disclosed subject matter relates to a clamp for a vehicle being tested in a wind tunnel. More particularly, the disclosed subject matter relates to methods and apparatus that can permit adjustment of and locking the orientation of the clamp teeth relative to a pinch weld on the vehicle and relative to a surface that supports the vehicle.

Aerodynamic drag is an increasingly important factor in ground vehicle (automotive) design due to its large impact on overall fuel economy for vehicles having an internal combustion engine or battery range for electric vehicles. Reducing automotive fuel/energy consumption (or increasing fuel/energy economy) and increasing the drivable range between battery recharging yields significant benefits, such as reducing global fossil fuel consumption and improving customer experience.

A vehicle's drag can be closely studied and possibly improved based on data collected from aerodynamic testing performed on the vehicle in a wind tunnel. The wind tunnel can include a stationary bed or a rolling road bed. The vehicle wheels do not rotate on a stationary bed and this lack of rotation can adversely affect the data and the resulting analysis. The vehicle's wheels can rotate on a rolling bed and the collected data can more closely simulate the aerodynamic conditions acting on the vehicle in real-world use. The vehicle can be secured to one or more load cells mounted within or below the test bed. The load cell(s) can include one or more sensors that are configured to output data that is indicative of the loads acting on the vehicle during the test. The data can be studied and the structure of the vehicle can be revised to provide an advantageous compromise between fuel efficiency and other factors such as, but not limited to, vehicle price, ease of manufacturing, perceived aesthetic appearance, and vehicle dimension.

SUMMARY

Some embodiments are directed to a clamp that can include a main clamp body, moving clamp body, a first jaw and a second jaw. The moving clamp body can be supported by and movable relative to the main clamp body. The first jaw can be connected to the main clamp body and rotatable relative to the main clamp body. The second jaw can be connected to the moving clamp body and rotatable relative to the moving clamp body.

Some embodiments are directed to a clamp that can include a main clamp body, a first jaw, a first jaw clamp, a moving clamp body, a second jaw, a second jaw clamp, a pin, a pin clamp, an adapter and an adapter fastener. The first jaw can be connected to the main clamp body and rotatable relative to the main clamp body about a first axis. The first jaw clamp can selectively lock the first jaw against rotation relative to the main clamp body. The moving clamp body can be movably mounted on the main clamp body. The second jaw can be connected to the moving clamp body and rotatable relative to the moving clamp body about a jaw axis that is parallel to the first axis. The second jaw clamp can selectively lock the second jaw against rotation relative to the moving clamp body. The pin can be connected to the main clamp body and rotatable relative to the main clamp body about a second axis that is orthogonal to the first axis. The pin clamp can selectively lock the pin against rotation relative to the main clamp body. The adapter can be connected to the pin to rotate about a third axis that is orthogonal to each of the first axis and the second axis. The adapter fastener can connect the adapter to the pin, and the adapter and the pin can freely pivot relative to each other.

Some embodiments are directed to a method for securing a clamp onto a pinch flange of a vehicle. The method can include: rotating a first jaw into a determined position relative to a main clamp body and a second jaw into a determined position relative to a moving clamp body; locking the first jaw and the second jaw in the determined positions; rotating a pin into relative to the main clamp body to locate a first axis in a first determined orientation relative to the pinch flange; locking the pin to the main clamp body when the first axis is in the first determined orientation, the locking the pin to the clamp body is independent from the locking the first jaw and the second jaw; rotating an adapter relative to the pin to locate a second axis in a second determined orientation relative to the pinch flange; locking the adapter to the pin when the second axis is in the second determined position, the locking the adapter to the pin is independent from the locking the first jaw and the second jaw and independent from locking the pin to the main clamp body; and clamping the first jaw and the second jaw onto the pinch flange.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
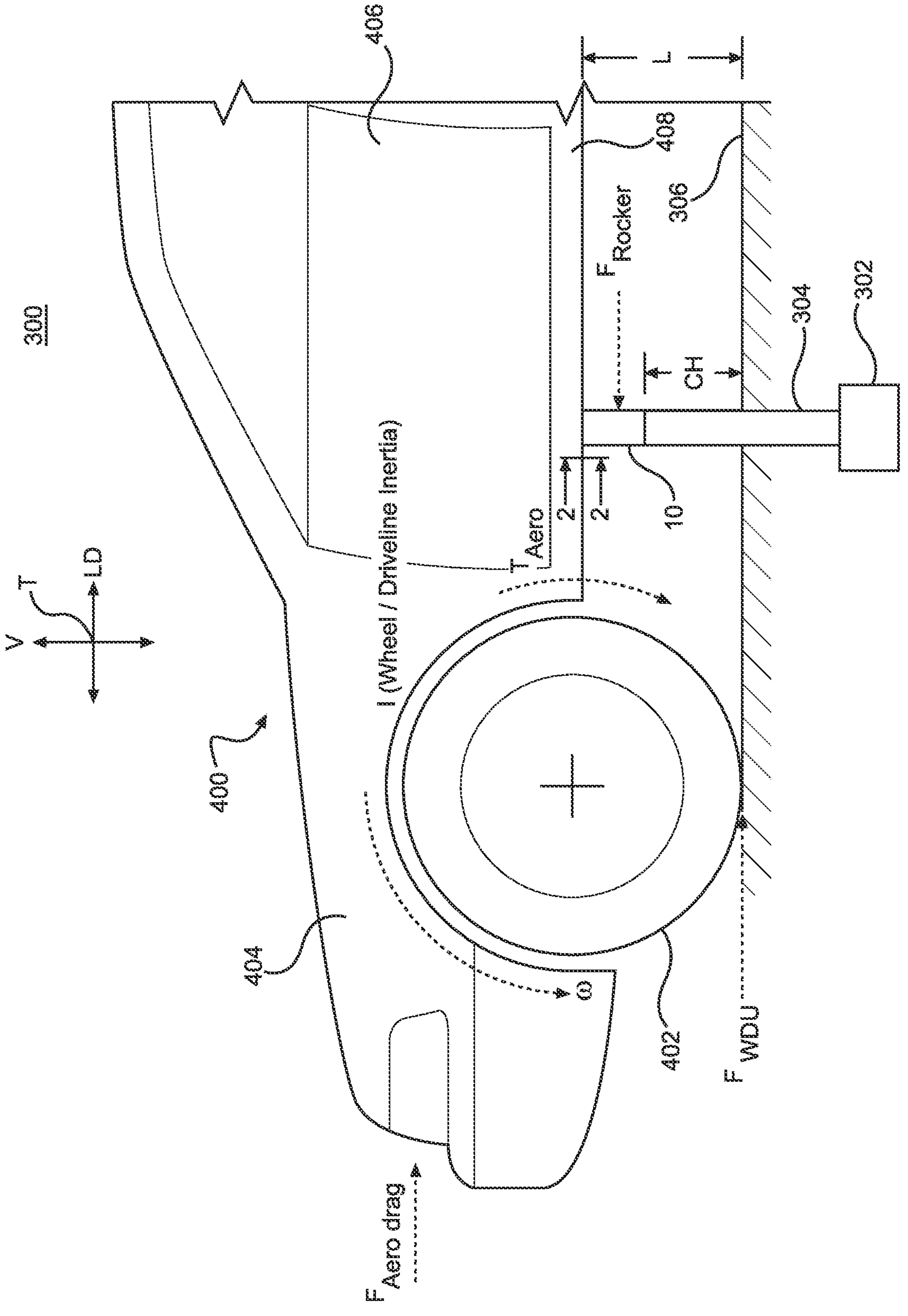
FIG. 1 is a schematic illustration of an adjustable rocker panel restraint clamp made in accordance with principles of the disclosed subject matter and clamped onto a vehicle in a wind tunnel.
Figure 2:
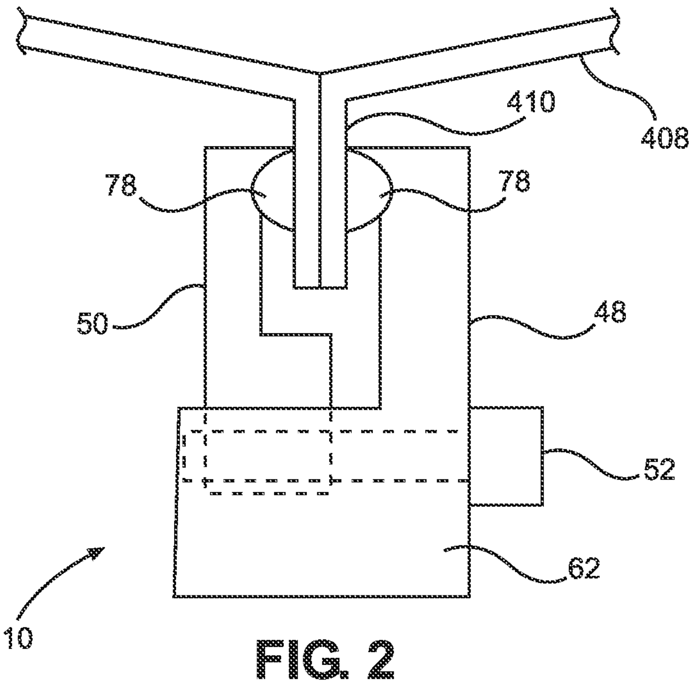
FIG. 2 is a cross-sectional view taken along line 2-2 of FIG. 1.

FIG. 1 schematically illustrates a side view of a front half of a vehicle 200 in a wind tunnel 300 and an adjustable rocker panel restraint clamp 10 made in accordance with principles of the disclosed subject matter. The clamp 10 can secure the vehicle 400 to piece of test equipment 302 of the wind tunnel 300. The vehicle 400 can include a front wheel 402, a front fender 404, a door 406 and a rocker panel 408. The rocker panel 408 can extend on a longitudinal direction LD of the wind tunnel 300 from the front fender 404 to a rear fender (not shown) and below the door 406 with respect to a vertical direction V of the wind tunnel 300. Referring to FIG. 2, the rocker panel 408 can include a flange 410 (also referred to as a pinch weld) and the clamp 10 can be clamped onto the flange 410. Returning to FIG. 1, the test equipment 302 can include a post 304 that is connected to the clamp 10. The test equipment 302 can be configured to detect the loads input from the clamp 10 and create data indicative of the aerodynamic loads acting on the vehicle 400 during the operation of the wind tunnel 300. The test equipment 302 can transmit the data to an appropriate data storage device and/or to a computer that can process the data for studying in real-time and/or stored for later use and study.

The wind tunnel 300 can include a test surface (also referred to as a ground plane) 306. The test surface 306 can be a surface of a stationary bed or a rolling road bed. The test surface 306 can be parallel to a longitudinal direction L and a transverse direction T of the wind tunnel 300. A vertical direction V of the wind tunnel 300 can be orthogonal to each of the test surface 306, the longitudinal direction L and the transverse direction T. It can be advantageous to orient the post 304 to be parallel to the vertical direction V of the wind tunnel 300.

The vehicle 400 being tested can come in many different configurations such as, but not limited to, a sports car, a sedan, a minivan, a pick-up, a sport-utility vehicle (also referred to as an SUV), a cross-over, motorcycle, boat, plane, etc. Each of these different configurations can have unique physical dimensions such as ride height and orientation of the flange 410 with respect to the longitudinal direction L, the transverse direction T and the vertical direction V. Some vehicles 400 can have a flange 410 that is skewed in with respect to one or more of the longitudinal direction L, the transverse direction T and the vertical direction V. Thus, it can be desirable for the clamp 10 to be adjustable so that the post 304 can be parallel to the vertical direction V regardless of the direction and magnitude of the skew of the flange 410 relative to the longitudinal direction L, the transverse direction T and the vertical direction V.

The clamp 10 can include a plurality of movable parts that rotate about a respective one of a first axis A1, a second axis A2, a third axis A3 and a fourth axis A4 (FIGS. 3 and 4) so that an adapter axis AA (FIGS. 3 and 4) of the clamp 10 is parallel to the vertical direction V regardless of the skew, if any, of the flange 410 relative to one or more of the longitudinal direction L, the transverse direction T and the vertical direction V. As a result, the clamp 10 can be securely clamped onto the flange 410 while the adapter axis AA (and the post 304 when connected to the clamp 10) is parallel to the vertical direction V.

FIG. 1 shows loads acting on the adjustable rocker panel clamp 10 during the wind tunnel test. When the vehicle 400 is tested in a wind tunnel 300 that includes a rolling road test bed 306, the clamp 10 can resist the force $F_{ROCKER}$, where $F_{ROCKER}=F_{AERO\ DRAG}+F_{WDU}$, and where $F_{WDU}$ refers to wheel drive unit force and $F_{AERO\ DRAG}$ refers to force on the vehicle due to aerodynamic drag in the wind tunnel. The wheel drive unit force $F_{WDU}$ can be determined from the wheel/driveline inertia I, the angular velocity ω of the wheel 202 (or the angular acceleration/deceleration of the wheel 402), the radius r of the wheel 402 (including the tire), and the aerodynamic torque $T_{AERO}$ applied to the wheel 402.

A predetermined clamp height CH can be set so that the moment applied to the clamp 10 about the third axis A3 will not adversely impact test data and/or damage the clamp 10 or the test equipment 302. That is, a maximum moment can be determined based on a range of possible rocker panel heights, and the clamp height CH can be set so that the moment applied to the clamp 10 at the fourth axis A4 is less than the maximum moment.

Figure 3:
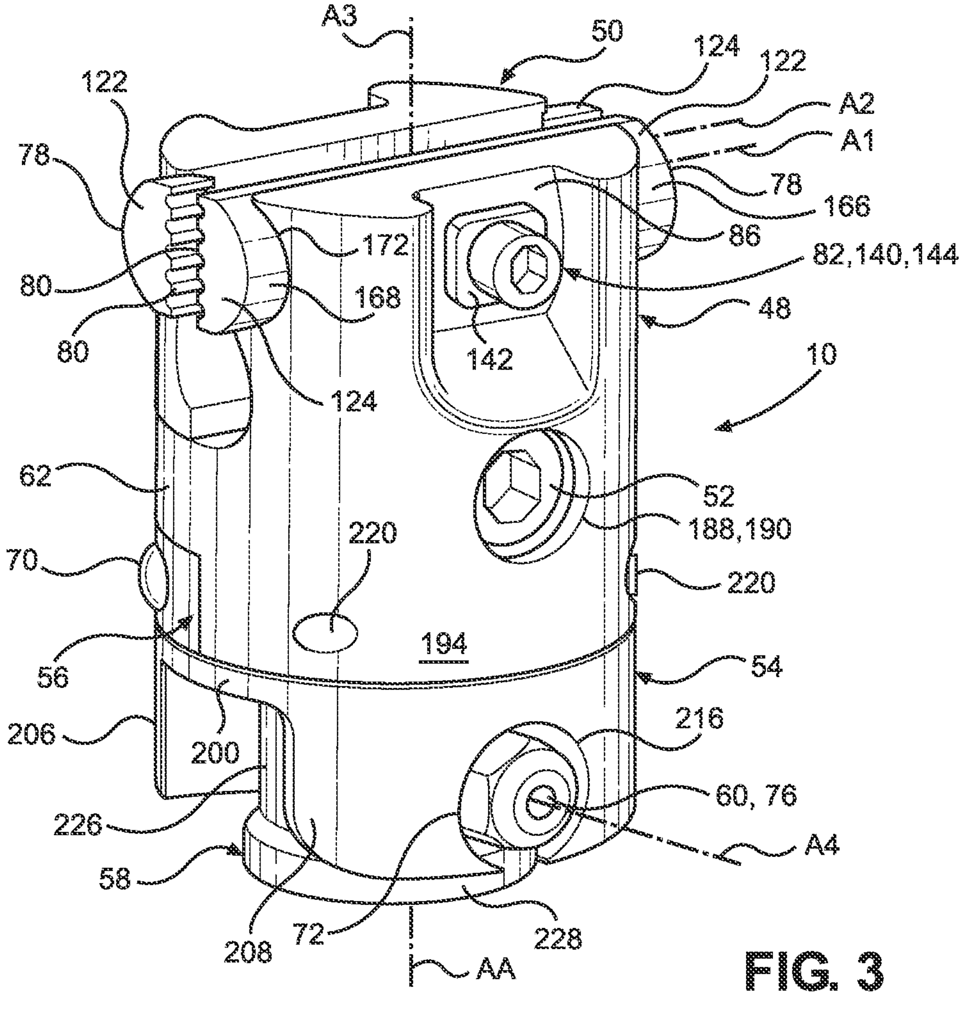
FIG. 3 is perspective view of a clamp made in accordance with principles of the disclosed subject matter.

FIG. 3 is a perspective view of an exemplary embodiment of the adjustable rocker panel restraint clamp 10 schematically depicted in FIG. 1 and made in accordance with principles of the disclosed subject matter. The clamp 10 can include a main clamp body 48, a moving clamp body 50, a drive member 52, a pin 54, a pin clamp 56, an adapter 58, an adapter fastener 60, a pair of jaws 78 and a pair of jaw clamps 82. The drive member 52 can be connected to the main clamp body 48 and the moving clamp body 50. The pin clamp 56 can selectively connect the pin 54 to the main clamp body 48. The adapter fastener 60 can connect the adapter 58 to the pin 54. The jaw clamps 82 can connect a respective one of the jaws 78 to a respective one of the clamp bodies 48, 50.

Figure 4:
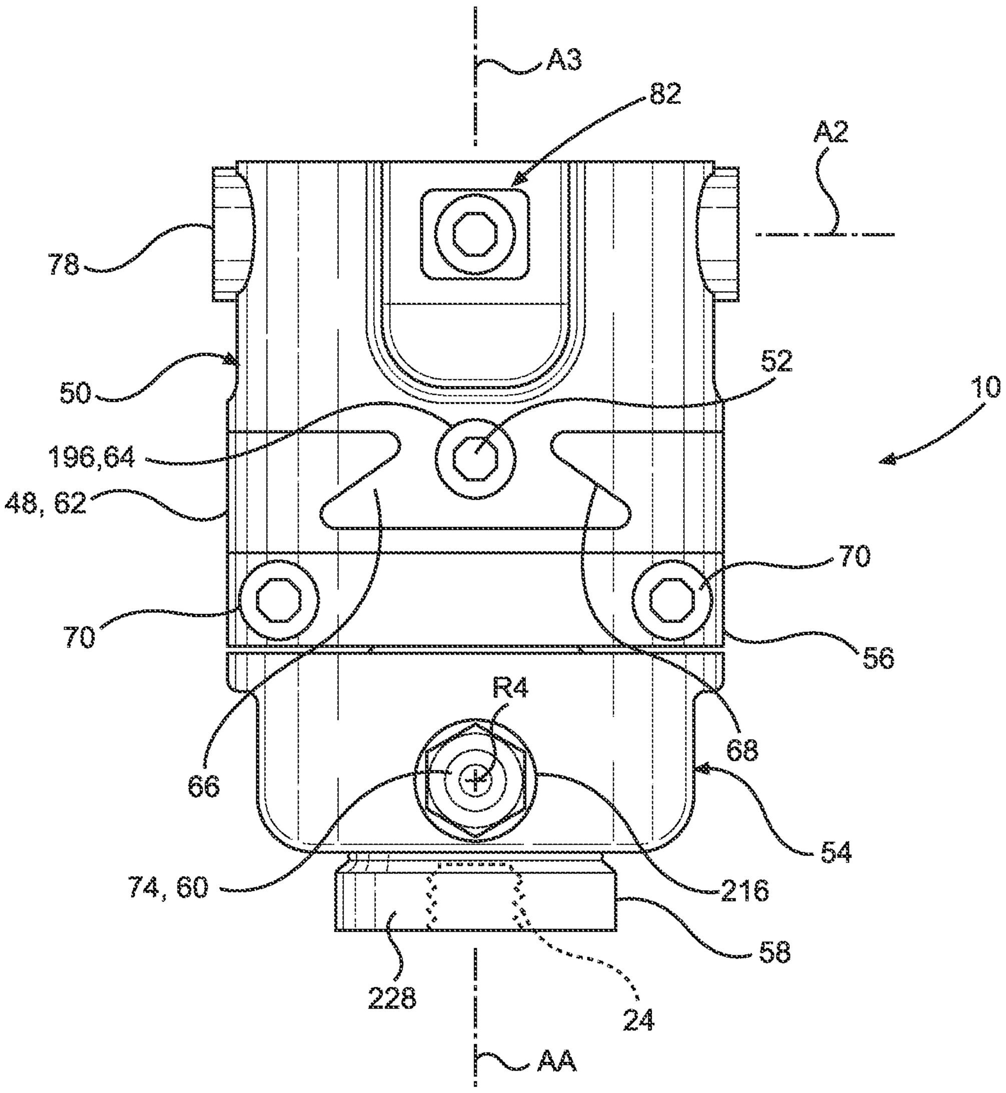
FIG. 4 is a plan view of the clamp of FIG. 3.
Figure 5:
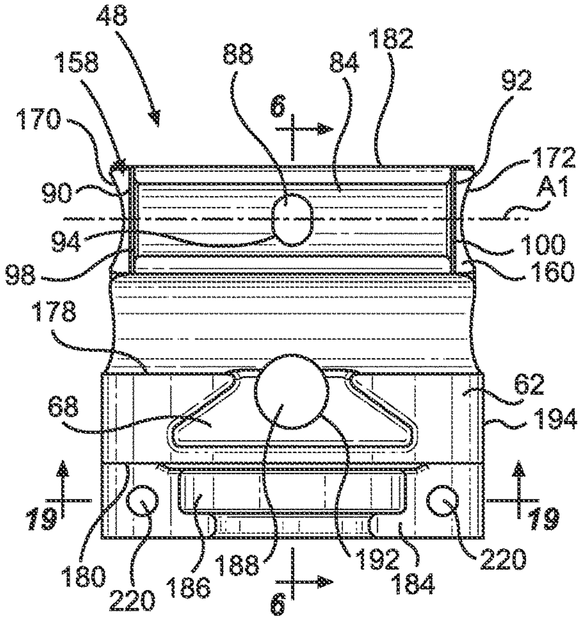
FIG. 5 is a plan view of a main clamp body of the clamp of FIG. 3.
Figure 9:
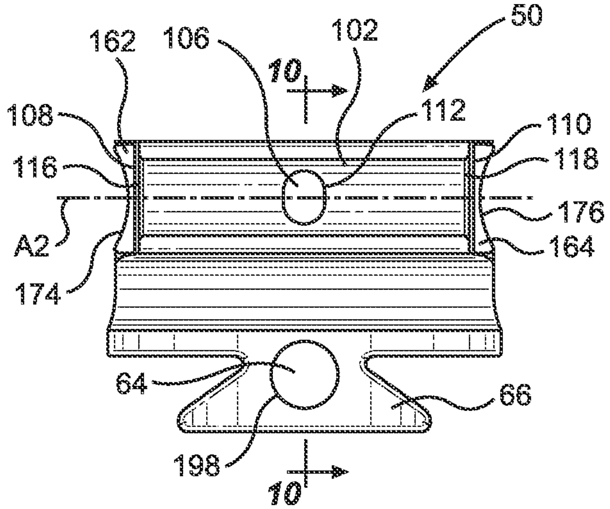
FIG. 9 is a plan view of a moving clamp body of the clamp of FIG. 3.

Referring to FIGS. 3-5, the main clamp body 48 can rotatably support one of the jaws 78 to rotate about the first axis A1. Referring to FIGS. 3, 4 and 9, the moving clamp body 50 can rotatably support one of the jaws 78 to rotate about a second axis A2 that is parallel to the first axis A1. The jaw clamps 82 selectively lock the jaws 78 in a desired rotational orientation with respect to main clamp body 48 and the moving clamp body 50. The jaw clamps 82 can be selectively unlocked to permit a different rotational adjustment of the jaws 78, as needed. Thus, the clamp 10 can be adjusted to compensate for a flange 410 that extends away from the bottom of the vehicle 400 in a direction that is at an angle with respect to the vertical direction V.

Referring FIGS. 3, 4, 6 and 21, the pin 54 and the main clamp body 48 can rotate relative to each other about the third rotation axis A3. The pin clamp 56 can selectively lock the pin 54 and main clamp body 48 to each other in a desired rotational orientation about the adapter axis AA. The pin clamp 56 can be selectively unlocked to permit a different rotational adjustment of the pin 54 and the main clamp body 48, as needed.

Referring to FIGS. 3, 4, 21 and 29, the pin 54 and the adapter 58 can pivot relative to each other about the fourth axis A4. The adapter fastener 60 can permit the pin 54 and the adapter 58 to freely pivot relative to each other in a desired angular orientation so that the adapter axis AA is parallel to the vertical direction V. The adapter fastener 60 can compensate for a flange 410 that extends along the length of the vehicle 400 in a direction that is oblique with respect to each of the longitudinal direction L, the transverse direction T and the test surface 306. Further or alternatively, the adapter fastener 60 can compensate for move of the vehicle 400 about a pitch axis of the vehicle 400.

Referring to FIGS. 4, 5, 8 and 9 collectively, a dovetail joint 66, 68 can connect the moving clamp body 50 to the main clamp body 48. The dovetail joint 66, 68 can include a dovetail pin 66 (also referred to as a pin or a tongue or a dovetail tongue) on the moving clamp body 50 and a dovetail groove 68 (also referred to as a groove) in the main clamp body 48. Alternate embodiments can include a reversed arrangement in which the main clamp body 48 includes the pin 66 and the moving clamp body 50 includes the groove 68. The groove 68 can have a mating shape that is complimentary to the dovetail shape of the pin 66. The pin 66 and groove 68 can prevent separation of the moving clamp body 50 away from the main clamp body 48 in a direction that is generally parallel to the third axis A3 while permitting the moving clamp body 50 to slide along the main clamp body 48 in a direction that is parallel to the movement axis AM (see FIGS. 6 and 10). The pin 66 and groove 68 can evenly distribute the load transmitted from the vehicle 400 to the clamp 10.

Figure 6:
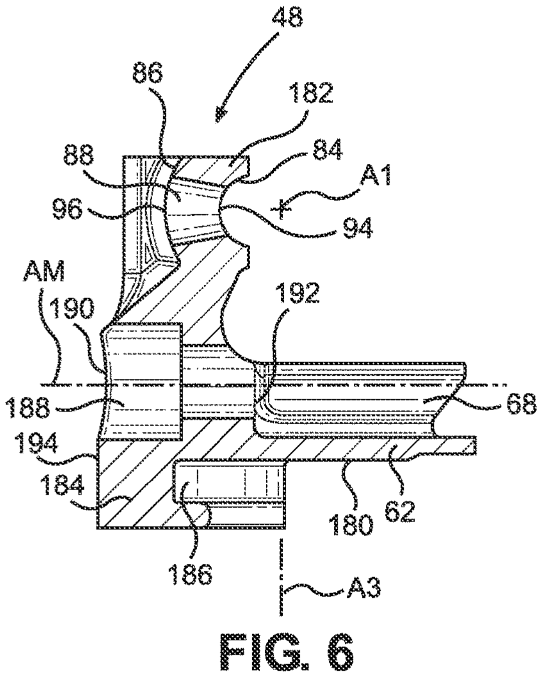
FIG. 6 is a cross-sectional view taken along section line 6-6 of FIG. 5.

Referring to FIGS. 3, 5 and 6, the main clamp body 48 can include a through hole 188. The through hole 188 can be centered about the movement axis AM. The through hole 188 can be a countersink hole with a first opening 190 and a second opening 192. The first opening can be on an outer surface 194 of the main clamp body 48. The first opening 190 can be on a portion of the outer surface 194 that is farthest from the groove 68 in a direction parallel to the movement axis AM. The second opening 192 can be in the groove 68 such that the second opening 192 is in communication with the groove 68. The first opening 190 can have a first diameter and the second opening 192 can have a second diameter that is smaller than the first diameter.

Figure 10:
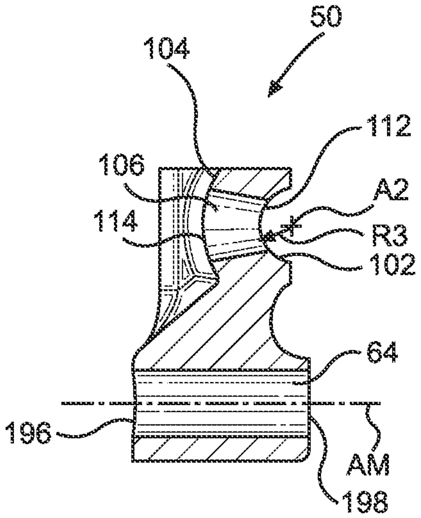
FIG. 10 is a cross-sectional view taken along section line 10-10 of FIG. 9.

Referring to FIGS. 4, 9 and 10, the moving clamp body 50 can include a threaded bore 64. The threaded bore 64 can extend through the pin 66 and include a first opening 196 and a second opening 198. The threaded bore 64 can be centered about the movement axis AM (FIG. 10) and aligned with the through hole 188 of the main clamp body 48.

Referring to FIGS. 3-8, the main clamp body 48 can include a clamp body support 62 that abuts and supports the moving clamp body 50. Referring to FIGS. 6 and 10, the drive member 52 can move the moving clamp body 50 along the clamp body support 62 toward and away from the main clamp body 48 in a direction that is parallel to the movement axis AM. The drive member 52 can maintain the clamping force applied by the moving clamp body 50 and clamp body 48 onto the rocker panel flange 410 and can also release the clamping force. FIGS. 2-4 show the drive member 52 as a socket head bolt. The drive member 52 can be threaded into the threaded bore 64 so that the drive member 52 functions as a drive screw. Rotation of the drive member 52 can pull or push the moving clamp body 50 toward or away from the main clamp body 48. The threaded bore 64 can be centered about the movement axis AM. In alternate embodiments, the drive member 52 can be any appropriate structure, device, system or apparatus that can cause the moving clamp body 50 to move toward and away from main clamp body 48 and maintain the clamping force after it has been set by a user.

Figure 7:
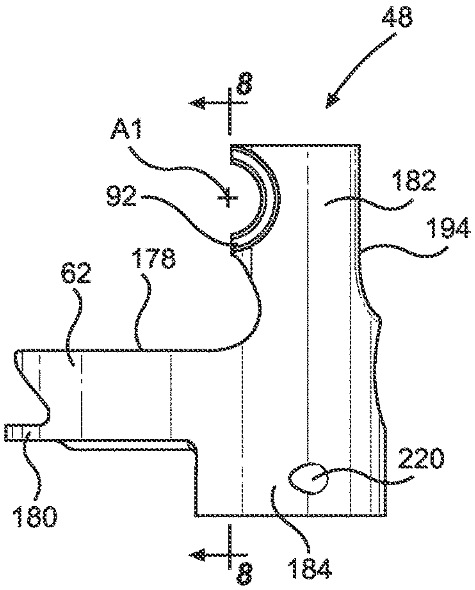
FIG. 7 is a plan view of the right side of the main clamp body of FIG. 5.
Figure 8:
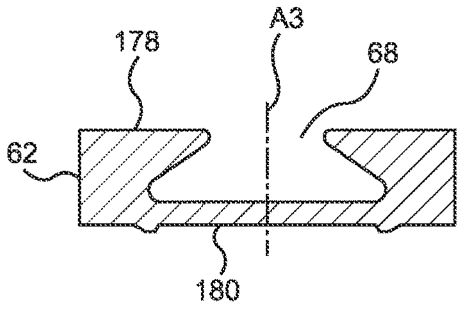
FIG. 8 is a cross-sectional view taken along section line 8-8 of FIG. 7.

Referring to FIGS. 5-7, the main clamp body 48 can include a first bearing surface 84, a convex surface 86, a through hole 88, and a second bearing surface 90 and a third bearing surface 92. Each of the first bearing surface 84 and the convex surface 86 can be a cylindrical surface that is centered about the first axis A1. Thus, the convex surface 86 can be concentric with the first bearing surface 84. The through hole 88 can include a first opening 94 in the first bearing surface 84 and a second opening 96 in the convex surface 86. Each of the openings 94, 96 can be elongated in a direction that is orthogonal to the first axis A1. The second opening 96 can be larger than the first opening 94 when measured in the direction that is orthogonal to the first axis A1.

The first bearing surface 84 can terminate at a pair of ends 98, 100 that are spaced away from each other along the first axis A1. The bearing surfaces 90, 92 can be curved surfaces that lie in planes that are orthogonal to the first axis A1. The second bearing surface 90 can be adjacent to and extend from first end 98 and the third bearing surface 92 can be adjacent to and extend from the second end 100. That is, the first end 98 can abut the second bearing surface 90 and the second end 100 can abut the third bearing surface 92.

Figure 11:
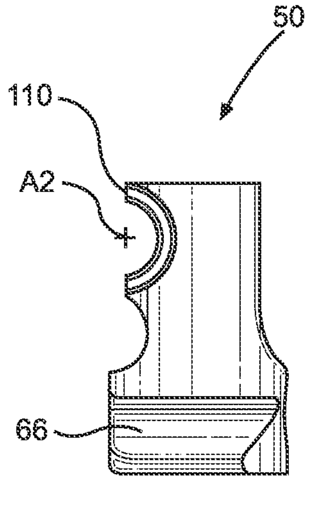
FIG. 11 is a plan view of the right side of the moving clamp body of FIG. 9.
Figure 12:
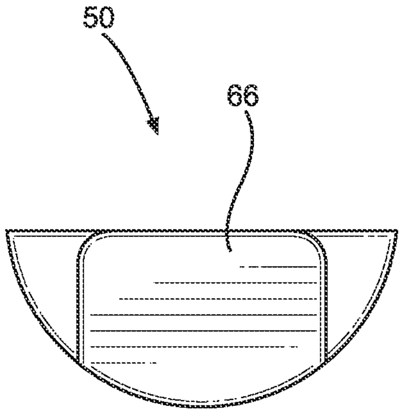
FIG. 12 is a plan view of the bottom of the moving clamp body of FIG. 9.

Referring to FIGS. 9-11, the moving clamp body 50, a first bearing surface 102, a convex surface 104, a through hole 106, and a second bearing surface 108 and a third bearing surface 110. Each of the first bearing surface 102 and the convex surface 104 can be a cylindrical surface that is centered about the second axis A2. Thus, the convex surface 104 can be concentric with the first bearing surface 84. The through hole 106 can include a first opening 112 in the first bearing surface 102 and a second opening 114 in the convex surface 104. Each of the openings 112, 114 can be elongated in a direction that is orthogonal to the second axis A2. The second opening 114 can be larger than the first opening 112 when measured in the direction that is orthogonal to the second axis A2.

The first bearing surface 102 can terminate at a pair of ends 116, 118 that are spaced away from each other along the second axis A2. The bearing surfaces 108,110 can be curved surfaces that lie in planes that are orthogonal to the second axis A2. The second bearing surface 108 can be adjacent to and extend from first end 116 and the third bearing surface 110 can be adjacent to and extend from the second end 118.

That is, the first end 116 can abut the second bearing surface 108 and the second end 118 can abut the third bearing surface 110.

Figure 13:
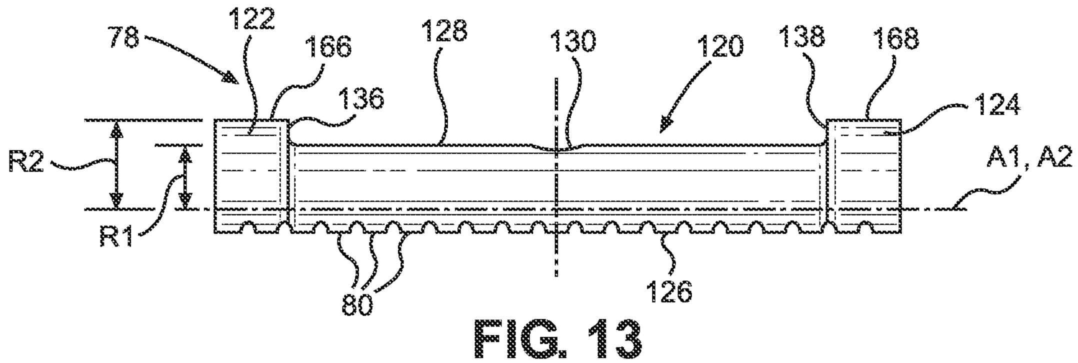
FIG. 13 is a plan view of a top of a jaw of the clamp of FIG. 3.
Figure 14:
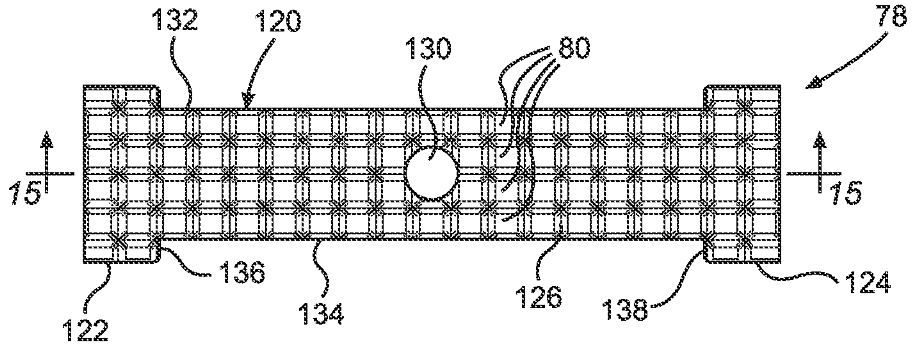
FIG. 14 is a plan view of a grip face of the jaw of FIG. 13.
Figure 15:
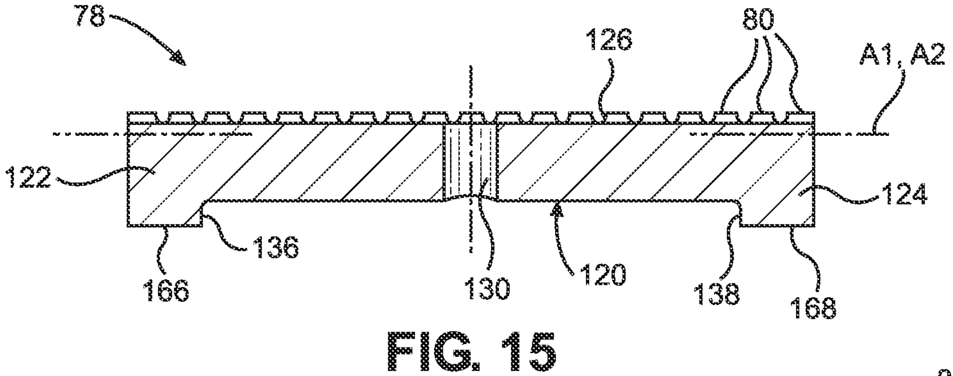
FIG. 15 is a cross-sectional view taken along section line 15-15 of FIG. 14.
Figure 16:
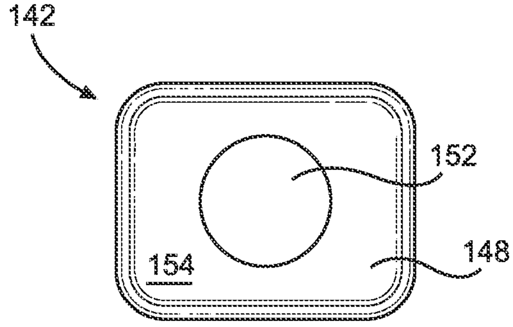
FIG. 16 is a plan view of a carrier of the clamp of FIG. 3.
Figure 17:
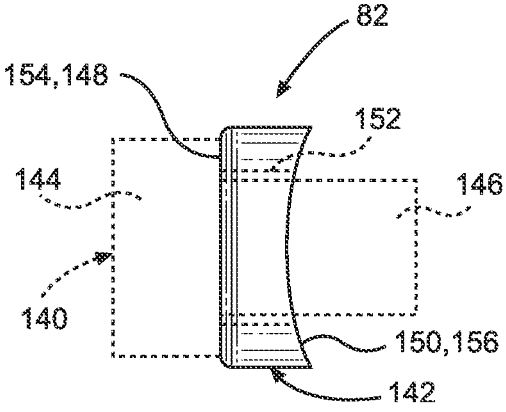
FIG. 17 is a plan view of the right side of the carrier of FIG. 16.
Figure 18:
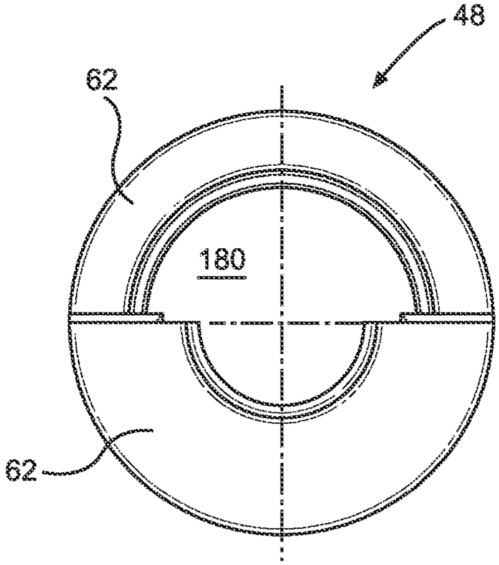
FIG. 18 is a plan view of the bottom of the main clamp body of FIG. 5.
Figure 19:
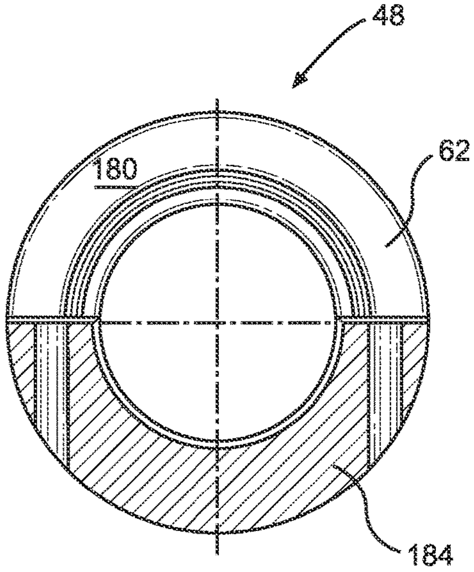
FIG. 19 is a cross-sectional view taken along section line 19-19 of FIG. 5.

Referring to FIGS. 13-15, each of the jaws 78 can include central body 120 and a pair of ends 122, 124. The central body 120 can extend from and be connected to each of the ends 122, 124 so that the ends 122, 124 are spaced away from each other by the central body 120 along the axes A1, A2.

The central body 120 can include a clamping side 126, a mating surface 128, a through hole 130. The clamping side 126 can include a plurality of teeth 80 that can engage the flange 210 when the clamp 10 is clamped onto the flange 410. The teeth 80 can deform the flange 410 of the rocker panel 408 when the adjustable rocker panel restraint clamp 10 is clamped onto the flange 410. This deformation can increase the clamping force applied to the flange 410 by the clamp 10.

Referring to FIG. 14, the clamping side 126 can terminate at a top end 132 and a bottom end 134 that are parallel to or substantially parallel to the axes A1, A2 such that one of ordinary skill in the art would perceive the ends 132, 134 as being parallel to the axes A1, A2. Referring to FIGS. 13 and 14, the mating surface 128 can be a curved surface that extends from the top and bottom ends 132, 134 of the clamping side 126. The mating surface 128 can be a cylindrical surface or a semi-cylindrical surface that is centered on the respective one of the first axis A1 and the second axis A2. The mating surface 128 can slide on a respective one of the first bearing surface 84 (FIG. 5) and the first bearing surface 102 (FIG. 9) when the jaws 78 rotate relative to the respective one of the clamp bodies 48, 50.

The cylindrical mating surface 128 of the jaw 78 that is mounted on the main clamp body 48 can be concentric with the first axis A1 and the cylindrical mating surface 128 of the jaw 78 mounted on the moving clamp body 48 can be concentric with the second axis A2. The mating surface 128 can have a first radius R1. The ends 122, 124 can be cylindrical and concentric with the mating surface 128 and have a second radius R2 that is larger than the first radius R1. The mating surface 84 can have a third radius R3 that is smaller than the second radius R2.

The ends 122, 124 of the jaw 78 can be spaced away from the first bearing surface 84 of the main clamp body 48 in a direction that is parallel to the first axis A1, and spaced away from the first bearing surface 102 of the moving clamp body 50 in a direction that is parallel to the second axis A2. The first end 122 can include a first arcuate bearing surface 136 that abuts a respective one of the second bearing surfaces 90, 108 and the second end 124 can include a second arcuate bearing surface 138 that abuts a respective one of the third bearing surfaces 92, 110. The arcuate bearing surfaces 136, 138 can be circular or semi-circular annular surfaces that are centered on the axes A1, A2.

Referring to FIGS. 3, 4, 16 and 17, each of the jaw clamps 82 can include a bolt 140 and a carrier 142. The bolt 140 is shown in phantom in FIG. 17. The bolt 140 can include a head 144 and a threaded shaft 146. The carrier 142 can include a first side 148, a second side 150 that is opposite to the first side, and a through hole 152. The first side 148 can have a flat surface and the second side 150 can have a concave surface. The through hole 152 can extend from the flat surface 154 of the first side 148 to the concave surface 156 of the second side 150. The bolt 140 can pass through the through holes 88, 106 and into the through hole 130 so that the head 144 abuts the flat surface 154. The through hole 130 can be a threaded hole into which the threaded shaft 146 can be threaded. The concave surface 156 can abut a respective one of the convex surfaces 86, 104 when the bolt 140 tightens the carrier 142 onto the respective one of main clamp body 48 and the moving clamp body 50.

Each of the clamp bodies 48, 50 can support and retain the jaw 78 when the jaw clamp is loosened or removed from the respective one of the clamp bodies 48, 50. The ends 122, 124 can restrict movement along the axes A1, A2. The jaw clamp 82 can maintain the jaw 78 on the respective one of the clamp bodies 48, 50 when the jaw clamp 82 is loosened but extending though the through hole 88 or 106 and at least partially threaded into the through hole 130. Referring to FIGS. 5 and 9, the main clamp body 48 can include a pair of rear support surfaces 158, 160 and the moving clamp body 50 can include a pair of rear support surfaces 162, 164. Referring to FIG. 13, the first end 122 of the jaw 78 can include a cylindrical outer surface 166 that abuts a respective on of the first rear support surfaces 158, 162 and the second end 124 of the jaw 78 can include a cylindrical outer surface 168 that abuts a respective on of the second rear support surfaces 160, 164. The support surfaces 158, 160, 162, 164 can be shorter than the cylindrical outer surfaces 166, 168 in a direction that is parallel to the axes A1, A2. Thus, the clamp bodies 48, 50 can support the jaw 78 when the jaw clamp 82 is loosened.

Referring to FIG. 5, the first rear support surface 158 can include a first curved edge 170 that is concave in a direction that is parallel to the first axis A1. The second rear support surface 160 can include a second curved edge 172 that is concave in a direction that is parallel to the first axis A1. Referring to FIG. 9, the first rear support surface 162 can include a first curved edge 174 that is concave in a direction that is parallel to the second axis A2. The second rear support surface 164 can include a second curved edge 176 that is concave in a direction that is parallel to the second axis A2.

Referring to FIGS. 5-8, 18 and 19 collectively, the clamp body support 62 can include a first surface 178 and a second surface 180. The main clamp body 48 can include a jaw support 182 that protrudes away from the first surface 178 along the third axis A3 (FIGS. 6 and 8) and a pin support 184 that protrudes away from the second surface 180 along the third axis A3. The jaw support 182 and the pin support 184 can protrude away from the clamp body support 62 in opposite directions that are parallel to the third axis A3. The jaw support 182 can include the first bearing surface 84, the convex surface 86, the through hole 88, the second bearing surface 90, the third bearing surface 92, the first opening 94, the second opening 96, the first end 98, the second end 100, the first rear support surface 158 and the second rear support surface the 160. The pin support 184 can protrude from the second surface 180 and include a pin groove 186. The pin groove 186 can be a semi-cylindrical groove.

Figure 20:
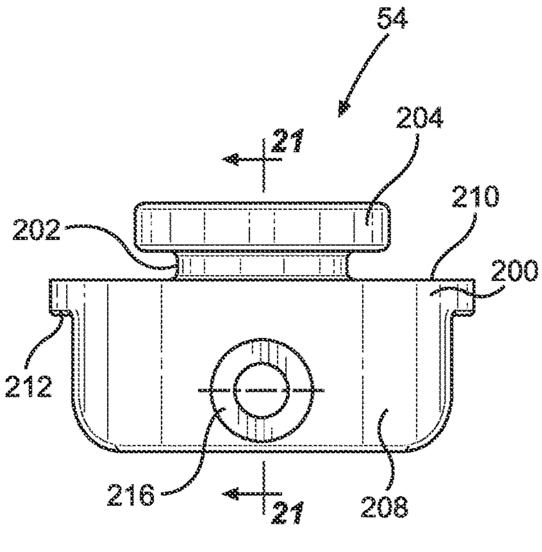
FIG. 20 is a plan view of a pin of the clamp of FIG. 3.
Figure 21:
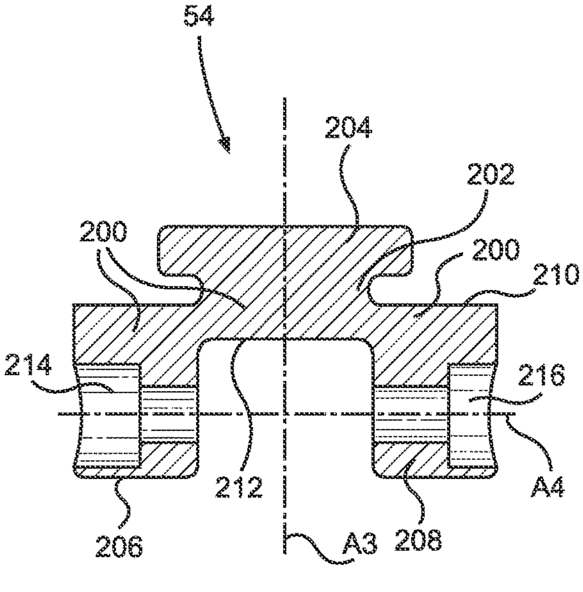
FIG. 21 is a cross-sectional view taken along section line 21-21 of FIG. 20.

Referring to FIGS. 20 and 21, the pin 54 can include a central body 200, a stem 202, a head 204, a first flange 206 and a second flange 208. The central body can have a top surface 210 and a bottom surface 212 opposing the top surface 210 in a direction that is parallel to the third axis A3. The stem 202 can protrude from the top surface 210 along the third axis A3 and have a first dimension measured in a direction that is orthogonal to the third axis A3. The head 204 can be connected to the stem 202 and spaced away from the top surface 210 by the stem 202. The head 204 can have a second dimension measured in a direction that is orthogonal to the third axis A3 and the second dimension can be larger than the first dimension. The head 204 can be located in the pin groove 186 of the main clamp body 48. The pair of flanges 206, 208 can protrude from the bottom surface 212. The first flange 206 can have a through hole 214 centered about the fourth axis A4 and a the second flange 208 can have a through hole 216 centered about the fourth axis A4. The through holes 214, 216 can be countersink holes.

Referring to FIGS. 3, 4 and 22-25 collectively, the pin clamp 56 can include clamp body 218 and a pair of bolts 70. The clamp body 218 can be a cylindrical or semi-cylindrical body. The pin clamp 56 can be referred to as a C-clamp.

Figure 22:
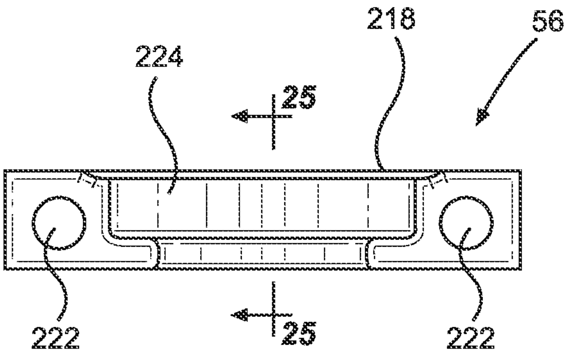
FIG. 22 is a plan view of a pin clamp of the clamp of FIG. 3.
Figure 23:
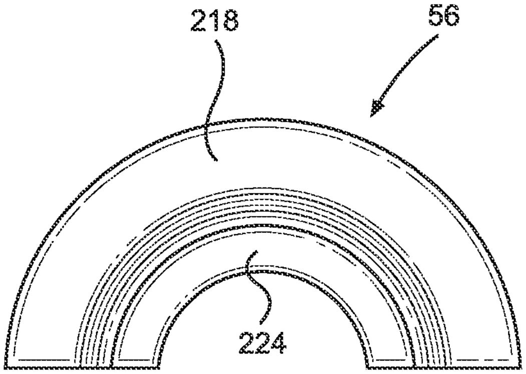
FIG. 23 is a plan view of the top of the pin clamp of FIG. 22.
Figure 24:
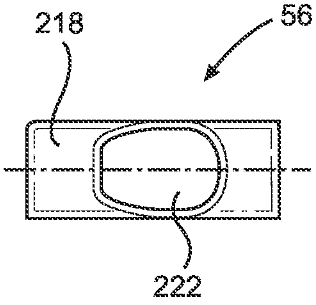
FIG. 24 is a plan view of the right side of the pin clamp of FIG. 22.
Figure 25:
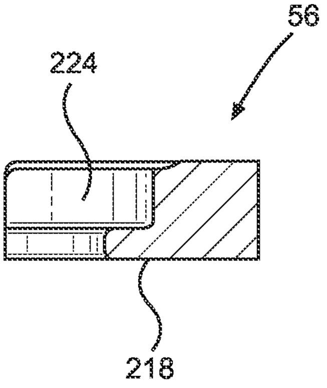
FIG. 25 is a cross-sectional view taken along section line 25-25 of FIG. 22.
Figure 26:
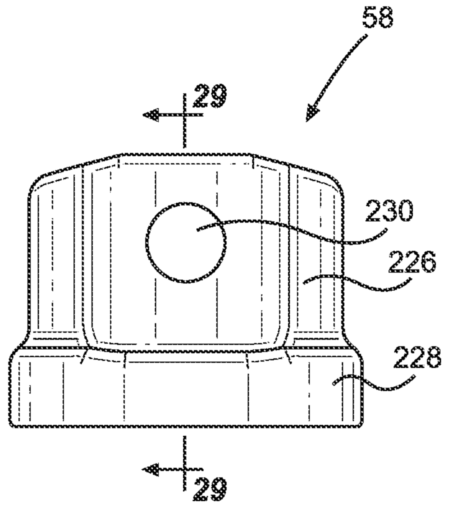
FIG. 26 is a plan view of an adapter of the clamp of FIG. 3.
Figure 27:
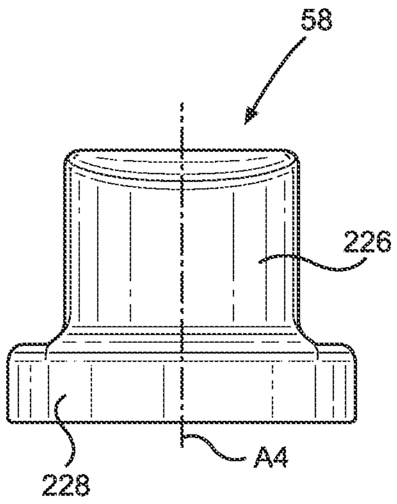
FIG. 27 is a plan view of the right side of the adapter of FIG. 26.
Figure 28:
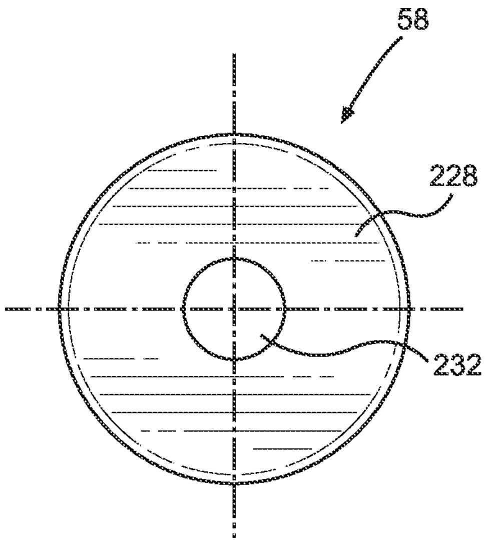
FIG. 28 is a plan view of the bottom of the adapter of FIG. 26.
Figure 29:
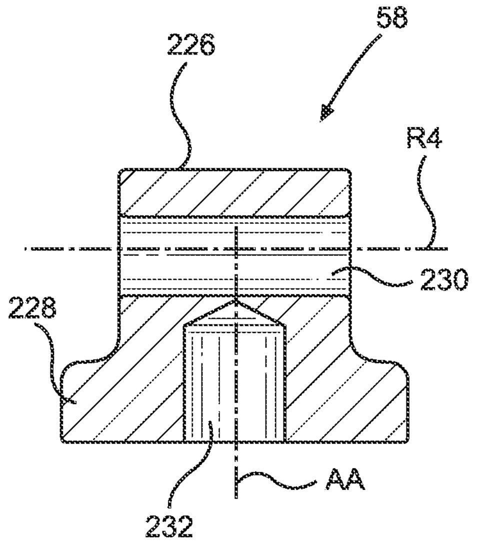
FIG. 29 is a cross-sectional view taken along section line 29-29 of FIG. 26.

Referring to FIGS. 3, 5, and 7, the main clamp body 48 can include a pair of through holes 220. Referring to FIGS. 22 and 24, the clamp body 218 can include a pair of through holes 222 that are aligned with the through holes 220 of the main clamp body 48. A respective one of the bolts 70 can pass through the through holes 222 and into the through holes 220. The through holes 220 can be threaded holes into which the bolts 70 are threaded.

Referring to FIGS. 3 and 4, the bolts 70 can be threaded into the main clamp body 48 to selectively tighten the pin clamp 56 against the main clamp body 48. The pin 54 and the main clamp body 48 can rotate relative to each other about the third axis A3 when the bolts 70 are loosened. The bolts 70 can be retightened when the pin 54 and main clamp body 48 have been rotated relative to each other into a desired orientation.

Returning to FIGS. 22, 23 and 25, the pin clamp 56 can include a groove 224. The groove 224 can be a semi-cylindrical groove that opposes and is aligned with the pin groove 186 of the main clamp body 48. The head 204 can be located in the pin groove 186 and the groove 224. The surfaces of the grooves 186, 224 can tightly engage the head 204 when the bolts 70 are tightened into the through holes 220, 222.

Referring to FIGS. 26-29, the adapter 58 can be a cylindrical structure that includes a central body 226 and a flange 228. The central body 226 can protrude from the flange 228 in a direction that is parallel to the adapter axis AA. The central body 226 can have a first diameter and the flange 228 can have a second diameter that is greater than the first diameter. Referring to FIGS. 3 and 4, the central body 226 can be located between the flanges 206, 208 of the pin 54 and the flange can be located outside of the pin 54 when the adapter axis AA is aligned with the third axis A3. The central body 226 can include a through hole 230 that is centered about the fourth axis A4 and aligned with the through holes 214, 216 of the pin 54.

Referring to FIGS. 3 and 4, the adapter fastener 60 can include a bolt 74 and a nut 76 can connect the adapter 58 to the pin 54. The bolt 74 can pass through the through holes 214, 216, 230. The adapter 58 can pivot on the bolt 74 to move relative to the pin 54.

The bolt 74 and nut 76 can permit the adapter 58 and the pin 54 to freely pivot relative to each other when the nut 76 is tightened onto the bolt 74. Referring to FIG. 21, the through holes 214, 216 can be countersunk so that the nut 76 and the head of the bolt 74 are spaced away from the opposing faces of the flanges 206, 208. Countersunk through holes 214, 216 can space the nut 76 and the head of the bolt 74 away from the adapter 58. Thus, the adapter 58 can pivot freely with respect to bolt 74. Conversely, the pin 54 can freely pivot relative to the adapter 58. The freely pivoting movement permitted by the adapter fastener 60 can compensate for movement of the flange 410 about the pitch axis of the vehicle 400. The fourth axis A4 can be referred to as a pitch axis.

Returning to FIGS. 28 and 29, the adapter 58 can include a blind bore 232 that is configured to be connected to post 304 in any appropriate manner such as but not limited to a threaded fastener, a clamp, etc.

Thus, the rocker panel restraint clamp 10 can permit a user to make a plurality of different angular adjustments on the clamp 10 that can be locked via the respective component clamps 56, 82. This adjustability can permit the clamp 10 to be used on a plurality of different vehicles 400, each having a different ride height and orientation of the rocker panel flange 410. Further, the component clamps 56, 82 can maintain the desired orientation of the jaws 78, the main clamp body 48 and the pin 54 even after the clamp 10 has been removed from the flange 410 of the rocker panel 408.

For example, a user of the clamp can perform the following steps. The user can rotate one of the jaws 78 into a determined position relative to a main clamp body 48 and the other jaw 78 into a determined position relative to a moving clamp body 50. The user can lock the jaws 78 in the determined positions via the jaw clamps 82. The pin 54 can be rotated relative to the main clamp body 48 to locate the axes A1, A2 in a first determined orientation relative to the pinch flange 410. The pin 54 can be locked to the main clamp body 48 when the axes A1, A2 are in the first determined orientation. The user can lock the pin 54 to the clamp body 48 independent from locking the jaws via the pin clamp 56. The adapter 58 can be rotated relative to the pin to locate the adapter axis AA axis in a second determined orientation relative to the pinch flange 410. The jaws 78 can be clamped onto the pinch flange via the drive member 52.

The user can further perform the following steps either in sequence or in other order. The user can unclamp the jaws 78 from the pinch flange 410 while maintaining each of the jaws 78 locked in the determined position relative to the main clamp body 48 and the moving clamp body 50, and the pin 54 locked to the main clamp body 48 with the first determined orientation. The user can subsequently re-clamp the jaws 78 onto the pinch flange 410 while maintaining each of the jaws locked in the determined position relative to the main clamp body 48 and the moving clamp body 50, and the pin 54 locked to the main clamp body 48 with the first determined orientation.

While certain embodiments of the invention are described above, it should be understood that the invention can be embodied and configured in many different ways without departing from the spirit and scope of the invention.

The main clamp body 48, the moving clamp body 50, the pin 54, the pin clamp 56 and the adapter 58 described above can have generally cylindrical outer shapes. However, any combination of the these components can have any appropriate shape that can facilitate use or manufacture of the clamp 10.

What is claimed is:

1. A clamp, comprising:

a main clamp body;

a first jaw connected to the main clamp body and rotatable relative to the main clamp body;

a moving clamp body support by and movable relative to the main clamp body; and a second jaw connected to the moving clamp body and rotatable relative to the moving clamp body;

a pin connected onto the main clamp body and rotatable relative to the main clamp body about a second axis;

a pin clamp having a semi-cylindrical shape; and a pair of pin clamping bolts passing through the pin clamp and threaded into the main clamp body to selectively tighten the pin clamp against the main clamp body, wherein the first jaw is rotatable relative to the main clamp body about a first axis that is orthogonal to the second axis.

2. The clamp according to claim 1, wherein the moving clamp body is movably mounted on the main clamp body so that the second jaw moves toward and away from the first jaw in a first direction, the first jaw rotates about a first axis that is orthogonal to the first direction and includes first teeth, the second jaw rotates about a second axis that is orthogonal to the first direction and includes second teeth that oppose the first teeth in the first direction.

3. The clamp according to claim 1, wherein the main clamp body includes a first bearing surface, the first jaw includes a first mating surface that slides on the first bearing surface when the first jaw rotates relative to the main clamp body, the moving clamp body includes a second bearing surface, the second jaw includes a second mating surface that slides on the second bearing surface when the second jaw rotates relative to the moving clamp body, and each of the first bearing surface, the first mating surface, the second bearing surface and the second mating surface is a cylindrical surface.

4. The clamp according to claim 3, further comprising:

a jaw clamp that selectively clamps the first jaw relative to the main clamp body such that the first jaw is rotationally fixed relative to the main clamp body and selectively unclamps the first jaw relative to the main clamp body such that the first jaw is rotatable relative to the main clamp body.

5. The clamp according to claim 4, wherein the jaw clamp includes, a bolt that includes a head and a threaded shaft, and a carrier that includes a first side that has a flat surface, a second side that is opposite to the first side, the second side has a concave surface, and a carrier through hole that extends from the flat surface to the concave surface, the main clamp body includes a convex surface and a body through hole, the first jaw includes a jaw through hole, the bolt passes through the carrier through hole and into the jaw through hole, and the head abuts the flat surface and the concave surface abuts the convex surface when the bolt tightens the carrier onto the main clamp body.

6. The clamp according to claim 5, wherein the first jaw is rotatable about a first axis, the convex surface is a cylindrical surface that is concentric with the first bearing surface, the body through hole includes a first opening in the first bearing surface and a second opening in the convex surface, each of the first opening and the second opening are elongated in a second direction that is orthogonal to the first axis, and the second opening is larger than the first opening when measured in the second direction.

7. A clamp, comprising:

a main clamp body;

a first jaw connected to the main clamp body and rotatable relative to the main clamp body;

a moving clamp body support by and movable relative to the main clamp body; and a second jaw connected to the moving clamp body and rotatable relative to the moving clamp body, wherein at least one of the first jaw and the second jaw includes, a central body that includes a clamping side that includes a plurality of teeth, and a semi-cylindrical surface that extends from the clamp side, has a first diameter, and is rotatably supported on a respective one of the main clamp body and the second jaw body, a pair of cylindrical ends spaced away from each other by the central body and protruding from respective ends of the central body, each of the cylindrical ends has a second diameter that is greater than the first diameter, and at least one of the main clamp body and the moving clamp body includes a bearing surface that is cylindrical and rotatably supports the semi-cylindrical surface, the bearing surface has a third diameter that is smaller than the second diameter.

8. The clamp according to claim 7, wherein the at least one of the main clamp body and the moving clamp body includes a pair of curved bearing surfaces that are orthogonal to the bearing surface, and the bearing surface is centered about a first axis and terminates at a pair of ends that are spaced away from each other along the first axis, a respective one of the ends abuts a respective one of the curved bearing surfaces.

9. The clamp according to claim 8, wherein each of the cylindrical ends has an arcuate bearing surface, a respective one of the arcuate bearing surfaces abuts a respective one of the curved bearing surfaces, and the arcuate bearing surfaces face each other in in a direction that is parallel to the first axis.

10. The clamp according to claim 1, further comprising:

an adapter; and a bolt and nut connecting the adapter to the pin such that the adapter is freely pivotable relative to the pin about a third axis that is orthogonal to each of the first axis and the second axis.

11. A clamp, comprising:

a main clamp body;

a first jaw connected to the main clamp body and rotatable relative to the main clamp body about a first axis;

a first jaw clamp selectively locking the first jaw against rotation relative to the main clamp body;

a moving clamp body movably mounted on the main clamp body;

a second jaw connected to the moving clamp body and rotatable relative to the moving clamp body about a jaw axis that is parallel to the first axis;

a second jaw clamp selectively locking the second jaw against rotation relative to the moving clamp body;

a pin connected to the main clamp body and rotatable relative to the main clamp body about a second axis that is orthogonal to the first axis;

a pin clamp selectively locking the pin against rotation relative to the main clamp body;

an adapter connected to the pin to rotate about a third axis that is orthogonal to each of the first axis and the second axis; and an adapter fastener connecting the adapter to the pin, and the adapter and the pin freely pivot relative to each other.

12. The clamp according to claim 11, further comprising:

a dovetail joint connecting the movable clamp body to the main clamp body, the dovetail joint include a dovetail groove in one of the main clamp body and the movable clamp body and a dovetail pin on a different one of the main clamp body and the movable clamp, the dovetail pin is inserted and movable in the dovetail groove; and a drive screw that extends through the main clamp body and is threaded into the movable clamp body such that rotation of the drive screw moves the moving clamp body relative to the main clamp body.

13. The clamp according to claim 11, wherein the main clamp body includes clamp body support that includes an upper surface than abuts the moving clamp body, a dovetail groove recessed from the upper surface, and a lower surface, a jaw support that protrudes from the upper surface, and a pin support that protrudes from the lower surface and includes a bottom surface that is parallel to the lower surface and a first pin groove that is located between the lower surface and the bottom surface, the moving clamp body includes a dovetail pin slidably mounted in the dovetail groove, the pin includes a central body that has a top surface and a bottom surface opposing the top surface in the second direction, a stem that protrudes from the top surface along the second axis and has a first dimension measured in a direction that is orthogonal to the second axis, a head that is connected to the stem and spaced away from the top surface by the stem, the head has a second dimension measured on the direction that is orthogonal to the second axis, the second dimension is larger than the first dimension, and the head is located in the first pin groove, and a pair of flanges protruding from the bottom surface, each of the flanges includes a through hole centered on the third axis.

14. The clamp according to claim 13, wherein the pin clamp includes a clamp body that abuts the pin support and includes a second pin groove that opposes the first pin groove, a pair of bolts passing through the pin clamp and threaded into the pin support, and the head of the pin is located in the second pin groove and clamped between the pin clamp and the pin support.

15. The clamp according to claim 13 wherein the second jaw clamp includes, a bolt that includes a bolt head and a threaded shaft, and a carrier that includes a first side that has a flat surface, a second side of the carrier that is opposite to the first side, the second side has a concave surface, and a carrier through hole that extends from the flat surface to the concave surface, the moving clamp body includes a bearing surface that abuts the second clamp, a convex surface, and a body through hole that includes a first opening at the convex surface and a second opening at the bearing surface, the each of first opening and second opening are elongated in along the second axis, and the first opening is larger than the second opening as measured in a direction that is parallel to the second axis, the second jaw includes a jaw through hole, the bolt passes through the carrier through hole and into the jaw through hole, and the bolt head abuts the flat surface and the concave surface abuts the convex surface when the bolt tightens the carrier onto the main clamp body.

16. The clamp according to claim 11, wherein the pin includes a pair of first through holes centered on the third axis, the adapter includes a second through hole that is centered on the third axis, and the adapter fastener includes a bolt that extends through the first through holes and the second through hole, and a nut that is threaded onto the bolt.

17. The clamp according to claim 11, wherein the first axis is parallel to the third axis and spaced away from each of the second axis and the third axis, and the second axis intersects the third axis.

* * * * *